ized Patent

(12) United States Patent
Ma et al.

(10) Patent No.: US 11,410,658 B1
(45) Date of Patent: Aug. 9, 2022

(54) MAINTAINABLE AND SCALABLE PIPELINE FOR AUTOMATIC SPEECH RECOGNITION LANGUAGE MODELING

(71) Applicant: Dialpad, Inc., San Francisco, CA (US)

(72) Inventors: Eddie Yee Tak Ma, Guelph (CA);
James Palmer, Novato, CA (US);
Kevin James, San Francisco, CA (US);
Etienne Manderscheid, San Francisco (CA)

(73) Assignee: Dialpad, Inc., San Ramon, CA (US)

( * ) Notice: Subject to any disclaimer, the term of this patent is extended or adjusted under 35 U.S.C. 154(b) by 232 days.

(21) Appl. No.: 16/667,577

(22) Filed: Oct. 29, 2019

(51) Int. Cl.
*G10L 15/01* (2013.01)
*G10L 15/04* (2013.01)
*G10L 15/22* (2006.01)
*G10L 15/26* (2006.01)
*G10L 15/30* (2013.01)

(52) U.S. Cl.
CPC ............. *G10L 15/26* (2013.01); *G10L 15/01* (2013.01); *G10L 15/04* (2013.01); *G10L 15/22* (2013.01); *G10L 15/30* (2013.01)

(58) Field of Classification Search
CPC ........ G10L 15/01; G10L 15/04; G10L 15/22; G10L 15/26; G10L 15/063
See application file for complete search history.

(56) References Cited

U.S. PATENT DOCUMENTS

| 7,379,867 B2 * | 5/2008 | Chelba | G06F 40/44 704/240 |
| 9,066,049 B2 * | 6/2015 | Scoggins, II | H04N 21/440236 |
| 9,953,634 B1 * | 4/2018 | Pearce | G10L 15/063 |
| 10,607,599 B1 * | 3/2020 | Shellef | G10L 25/60 |
| 11,017,778 B1 * | 5/2021 | Thomson | G10L 15/22 |
| 11,024,316 B1 * | 6/2021 | Fu | G10L 17/00 |
| 2004/0024585 A1 * | 2/2004 | Srivastava | G10L 25/78 704/10 |
| 2004/0030740 A1 * | 2/2004 | Stelting | G06F 8/36 709/201 |
| 2004/0064317 A1 * | 4/2004 | Othmer | G10L 15/30 704/260 |

(Continued)

OTHER PUBLICATIONS

Hazen, Timothy J. "Automatic alignment and error correction of human generated transcripts for long speech recordings." Ninth International Conference on Spoken Language Processing. (Year: 2006).*

(Continued)

*Primary Examiner* — Daniel C Washburn
*Assistant Examiner* — Oluwadamilola M Ogunbiyi
(74) *Attorney, Agent, or Firm* — Patent Law Works LLP

(57) ABSTRACT

Audio data saved at the end of client interactions are sampled, analyzed for pauses in speech, and sliced into stretches of acoustic data containing human speech between those pauses. The acoustic data are accompanied by machine transcripts made by VoiceAI. A suitable distribution of data useful for training and testing are stipulated during data sampling by applying certain filtering criteria. The resulting datasets are sent for transcription by a human transcriber team. The human transcripts are retrieved, some post-transcription processing and cleaning are performed, and the results are added to datastores for training and testing an acoustic model.

22 Claims, 9 Drawing Sheets

(56) References Cited

U.S. PATENT DOCUMENTS

| | | | | |
|---|---|---|---|---|
| 2005/0223392 | A1* | 10/2005 | Cox | G06Q 10/06 719/328 |
| 2006/0112123 | A1* | 5/2006 | Clark | G06F 40/18 |
| 2006/0149558 | A1* | 7/2006 | Kahn | G10L 15/18 704/278 |
| 2007/0027686 | A1* | 2/2007 | Schramm | G10L 13/00 704/235 |
| 2007/0071206 | A1* | 3/2007 | Gainsboro | G10L 25/63 379/168 |
| 2007/0106494 | A1* | 5/2007 | Detlef | G10L 15/26 704/9 |
| 2008/0154594 | A1* | 6/2008 | Itoh | G10L 15/04 704/235 |
| 2008/0195370 | A1* | 8/2008 | Neubacher | G10L 13/00 704/1 |
| 2008/0319743 | A1* | 12/2008 | Faisman | G10L 15/065 704/235 |
| 2010/0121637 | A1* | 5/2010 | Roy | G10L 15/22 704/235 |
| 2012/0331038 | A1* | 12/2012 | Yang | G06F 9/54 709/203 |
| 2013/0262110 | A1* | 10/2013 | Xie | G10L 15/005 704/235 |
| 2014/0122723 | A1* | 5/2014 | Glover | G06F 9/5072 709/226 |
| 2014/0214421 | A1* | 7/2014 | Shriberg | G10L 25/87 704/243 |
| 2015/0364131 | A1* | 12/2015 | Hakkani-Tur | G10L 15/26 704/235 |
| 2015/0379983 | A1* | 12/2015 | Siohan | G10L 15/063 704/244 |
| 2016/0163309 | A1* | 6/2016 | Itoh | G10L 15/197 704/9 |
| 2016/0163310 | A1* | 6/2016 | Lee | G10L 15/19 704/232 |
| 2016/0365090 | A1* | 12/2016 | Nissan | G10L 15/19 |
| 2017/0140759 | A1* | 5/2017 | Kumar | G10L 15/30 |
| 2017/0206891 | A1* | 7/2017 | Lev-Tov | G06N 20/00 |
| 2017/0293680 | A1* | 10/2017 | Boguraev | G06F 16/3329 |
| 2018/0053510 | A1* | 2/2018 | Kofman | G06F 16/685 |
| 2018/0239822 | A1* | 8/2018 | Reshef | G06F 40/242 |
| 2018/0315428 | A1* | 11/2018 | Johnson | G10L 15/01 |
| 2018/0348198 | A1* | 12/2018 | Broadwell | A61B 5/14532 |
| 2019/0020546 | A1* | 1/2019 | Bhandarkar | G06F 8/30 |
| 2019/0379777 | A1* | 12/2019 | Jo | G10L 15/22 |
| 2020/0066281 | A1* | 2/2020 | Grancharov | G10L 17/00 |
| 2021/0043319 | A1* | 2/2021 | Lequeux | G16H 10/60 |

OTHER PUBLICATIONS

Chan, Ho Yin, and Phil Woodland. "Improving broadcast news transcription by lightly supervised discriminative training." 2004 IEEE International Conference on Acoustics, Speech, and Signal Processing. vol. 1. (Year: 2004).*

Wu, Yi, Rong Zhang, and Alexander Rudnicky. "Data selection for speech recognition." 2007 IEEE Workshop on Automatic Speech Recognition & Understanding (ASRU). (Year: 2007).*

Novotney, Scott, Richard Schwartz, and Jeff Ma. "Unsupervised acoustic and language model training with small amounts of labelled data." 2009 IEEE International Conference on Acoustics, Speech and Signal Processing. (Year: 2009).*

* cited by examiner

US 11,410,658 B1

MAINTAINABLE AND SCALABLE PIPELINE FOR AUTOMATIC SPEECH RECOGNITION LANGUAGE MODELING

TECHNICAL FIELD

This disclosure pertains generally to voice-to-text processing, and more specifically to an automated pipeline that creates sets of training and testing data for language modeling.

BACKGROUND

Voice-to-text transcription is a quickly developing field. Currently, a pipeline for Automatic Speech Recognition (ASR) modeling requires a lot of human intervention in preparing the training and testing data sets for the modeling, and the vast majority of its operation depends upon workflows that are partially or wholly memorized and implemented with a lot of human intervention by team members.

It would be desirable to address these issues.

SUMMARY

An automated pipeline for creating sets of training and testing data for language modeling is provided. The automated pipeline includes a variety of cells with different functions chained together to form a cell-based pipeline that automates the creation of sets of training and testing data. The created training and testing datasets are applied to the acoustic model development.

The cells in the pipeline have certain common features: scalable, testable, callable as a webservice, schedulable, accepting parameterization, isolation (faults in one cell do not bring down the whole pipeline), with discrete brief actions being represented by individual cells and complexity being achieved by chaining individual cells together to form a pipeline, etc.

To prepare audio samples for human transcription, the cell-based pipeline may include a sample selection cell that selects one or more samples from client interaction data for human transcription, an audio slicing cell that slices each selected sample into stretches of acoustic data containing human speech between pauses in speech, and a transcriber platform forwarding cell that transmits the stretches of acoustic data to a respective transcriber platform, or to storage to be retrieved later by the respective transcriber platform.

To forward selected samples for human transcription, the cell-based pipeline may further include a queue-in cell that includes a queue with a list of queued jobs for human transcription, and a respective transcriber platform manager cell that draws transcription lines from the queue-in cell for a target transcriber platform. In some implementations, for certain transcriber platforms, the cell-based pipeline may optionally include a queue-out cell that includes a queue of data including human transcripts to be asynchronously pulled back from stored transcripts after human transcription.

To ensure accuracy, the cell-based pipeline may further include an error detection cell that detects errors from human transcription, a word editing cell that edits or corrects detected errors, and a transcript edits-implementing cell that reduces edits implemented in different formats to get edited human transcripts.

To prepare training and testing datasets from edited transcripts, the cell-based pipeline may further include a raw transcript importing cell that imports edited raw human transcripts, a dataset selection cell that specifies raw corpus transcript lines to select, name the selection, and specify a cleaning operation to run on a named selection, a corpus cleaning cell that cleans selected transcript lines, and a result saving cell that saves cleaned transcript lines using that named selection. The saved transcript lines may be then used for quality assurance, and training and testing dataset development.

The Figures depict various implementations for purposes of illustration only. One skilled in the art will readily recognize from the following discussion that alternative implementations of the structures and methods illustrated herein may be employed without departing from the principles described herein.

DETAILED DESCRIPTION

Figure 1:
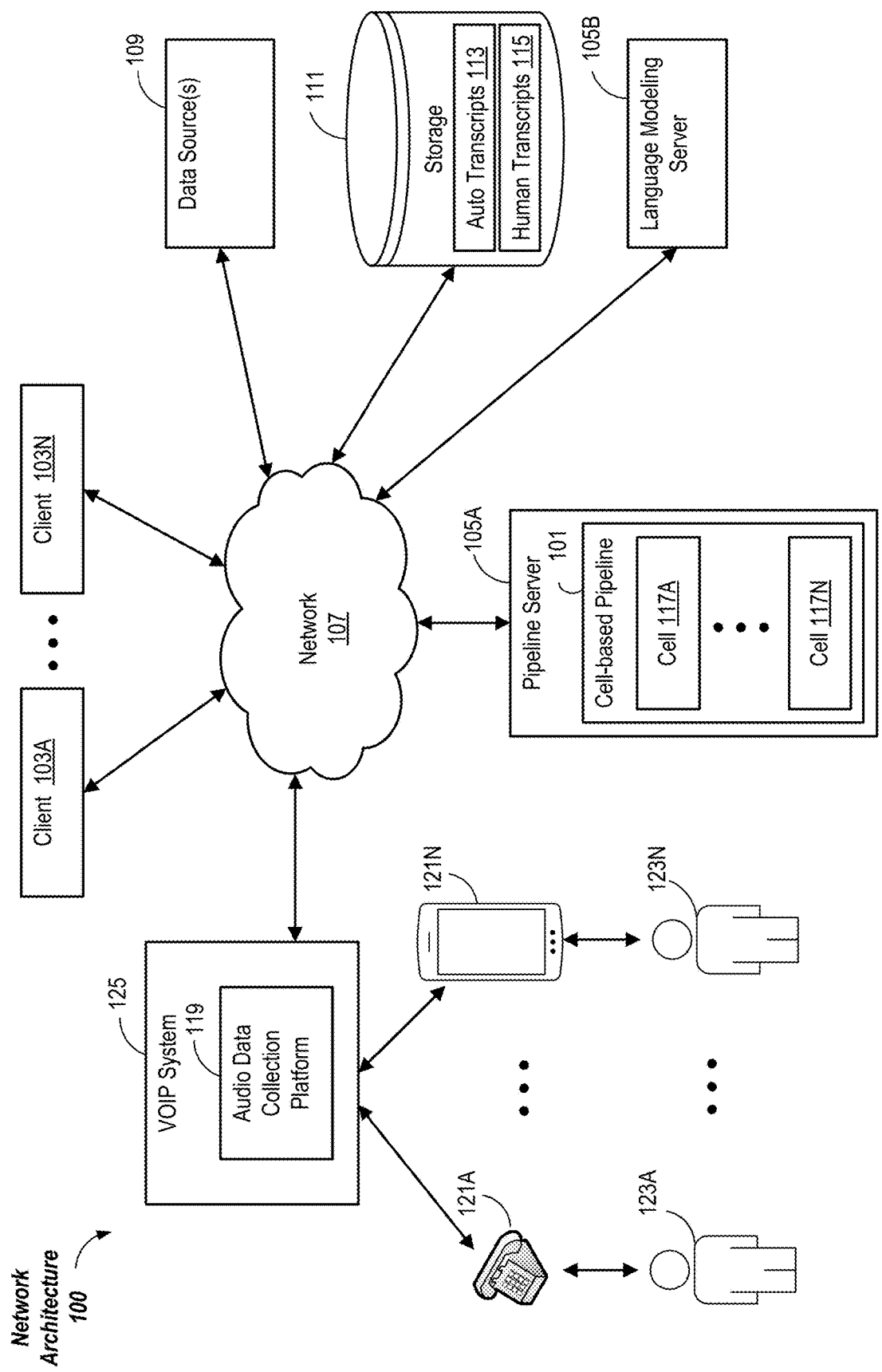
FIG. 1 is a block diagram of an exemplary network architecture in which a cell-based pipeline can be implemented, according to some implementations.

FIG. 1 is a high-level block diagram illustrating an exemplary network architecture 100 in which a cell-based pipeline 101 can be implemented. The illustrated network architecture 100 comprises a pipeline server 105A for implementing a cell-based pipeline 101, a language modeling server 105B for language modeling, multiple clients 103A-103N, an audio data collection platform 119 for audio data collection, a data source(s) 109 for storing audio data, and a storage 111 for storing auto transcripts 113 and human transcripts 115. The audio data collection platform 119 may collect audio data when users 123A and 123N are using communication devices such as 121A and 121N to communicate over, e.g., a VoIP (Voice over Internet Protocol) system 125. It is to be understood that this is an example only. In some implementations, various functionalities of the pipeline server 105A can be instantiated on the language modeling server 105B, the audio data collection platform 119, the clients 103, etc., and various functionalities of the language modeling server 105B can be instantiated on the pipeline server 105A, the audio data collection platform 119, the clients 103, etc. In some implementations, the data source(s) 109 and the storage 111 can be combined into a single storage, or spread across multiple storage areas as desired.

The clients 103, the pipeline server 105A, the language modeling server 105B, and the audio data collection platform 119 may be implemented using computer systems 210 such as the one illustrated in FIG. 2 and described below. The clients 103, the pipeline server 105A, the language modeling server 105B, and the audio data collection platform 119 are communicatively coupled to a network 107, for example via a network interface 248 as described below in conjunction with FIG. 2. Clients 103 are able to access applications and/or data on the pipeline server 105A, the language modeling server 105B, and the audio data collection platform 119 using, for example, a web browser or other client software (not shown). Clients 103 can be in the form of mobile computing devices, comprising portable computer systems capable of connecting to a network 107 and running applications (e.g., smartphones, tablet computers, wearable computing devices, etc.). Clients may also be in the form of laptops, desktops, and/or other types of computers/computing devices. The pipeline server 105A, the language modeling server 105B, and the audio data collection platform 119 can be in the form of the aforementioned computing devices, or in the form of, for example, rack-mounted computing devices, located, e.g., in data centers.

The cell-based pipeline 101 in the pipeline server 105A includes multiple cells 117A-117N that may be chained together to form a pipeline for specific functions. Each cell may act independently to achieve a part of the specific functions of the whole pipeline 101. In one example, the cell-based pipeline 101 may be applied to create sets of training and testing data for language modeling. To achieve this, the cell-based pipeline 101 may retrieve audio data from the data source(s) 109 or directly from the audio data collection platform 119. The cell-based pipeline 101 may then select certain audio data and slice them into chunks of desired sizes. The specific size(s) into which to slice data is a variable parameter, and can be based on content of the audio data and other factors. The slices of audio data, accompanied with VoiceAI transcripts (i.e., auto transcripts transcribed by existing text-to-speech tools) may be then forwarded to one or more transcriber platforms (or teams) for human transcription. The human transcripts and the accompanied VoiceAI transcripts, upon being returned to the cell-based pipeline 101, may be further processed by the cells 117 in the pipeline 101, such as error detection, correction, and other editing. The edited transcripts are then cleaned through corpus cleaning and certain transcripts are selected as training and testing datasets for language modeling on the language modeling server 105B. More details concerning the cell-based pipeline 101 are provided below in conjunction with the descriptions in FIGS. 3-6D.

The audio data collection platform 119 collects different audio data from user interactions. The collected audio data may vary greatly in content, topic, time length, clarity, speech style, speech speed, environment, etc. The collected audio data may be stored locally or remotely in the data store(s) 109. In one implementation, the audio data collection platform 119 may be a telephony platform that provides customer services, such as a VoIP or video conferencing (e.g., AVoIP (AV over IP)) system.

The data store(s) 109 may store audio data collected by the audio data collection platform 119 and/or audio data collected through other channels or approaches. The data store(s) 109 may also store other data (e.g., data slices) generated by the components in the system 100.

The storage 111 may store auto transcripts 113 and human transcripts 115 processed by the cell-based pipeline 101 and other speech recognition tools, or other data processed by the components in the system 100. As discussed above, while illustrated as separate components, the data store(s) 109 and the storage 111 may be combined into a single storage component. For instance, the data store(s) 109 and the storage 111 may be both located in cloud storage (e.g., Google Storage) that enables webservices.

The language modeling server 105B may manage language modeling or other voice-to-text/speech recognition related functions. In one implementation, the language modeling server 105B may include a platform for developing acoustic models for different purposes. These acoustic models may help recognize human speech or other audio data, and may determine additional actions based on the speech recognition (e.g., provide automatic replies, or route a customer to a proper service channel, etc.). In one implementation, the language modeling server 105B may communicate with the pipeline server 105A to retrieve training and testing datasets created by the cell-based pipeline 101, to develop and optimize acoustic models.

In one implementation, the network 107 is in the form of the Internet. Other networks 107 or network-based environments can be used in other implementations.

Although FIG. 1 illustrates two clients 103 and two communication devices 121 as an example, in practice many more (or fewer) clients 103 or communication devices 121 can be deployed, including orders of magnitude more.

Figure 2:
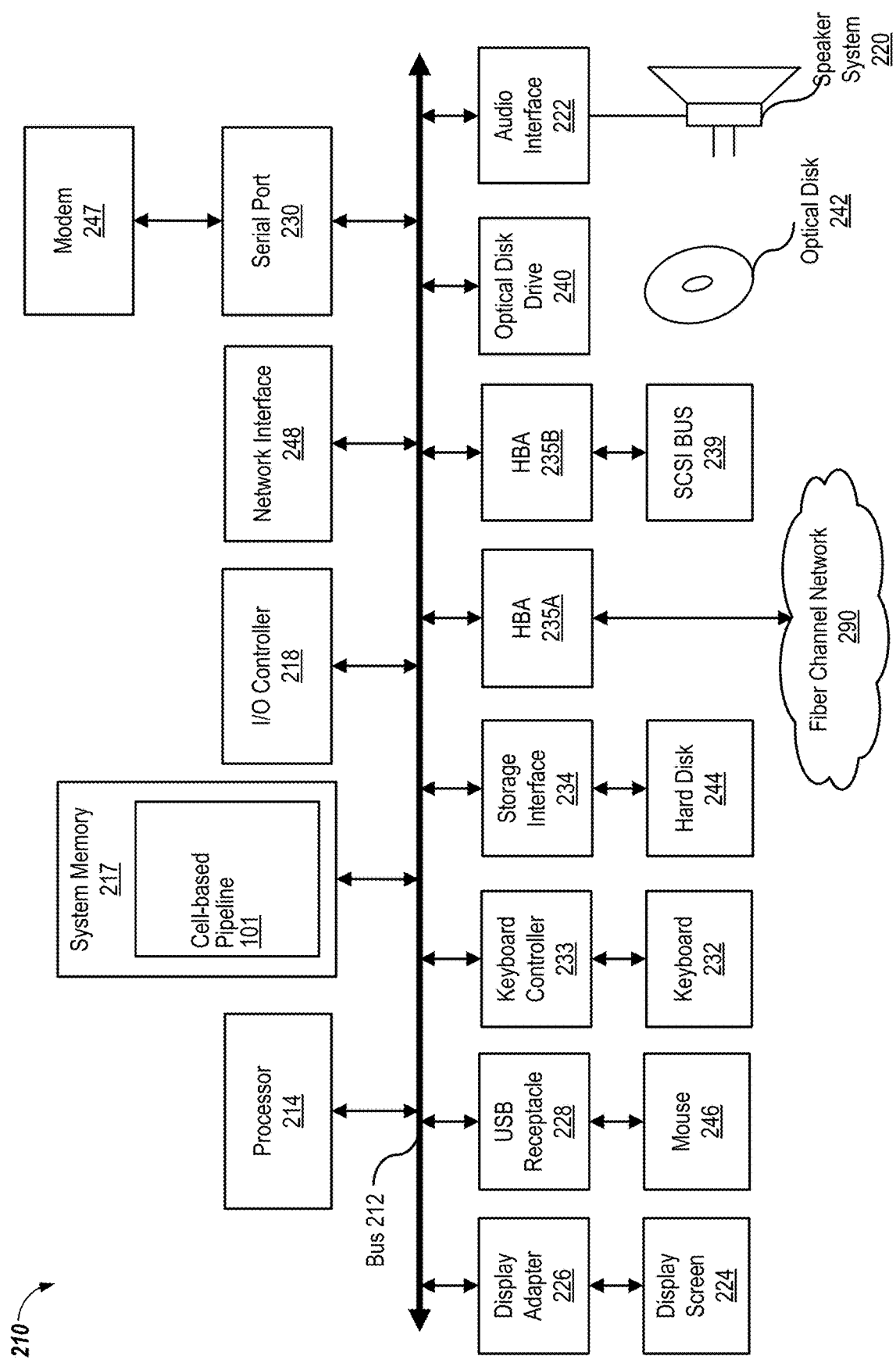
FIG. 2 is a block diagram of an exemplary computer system suitable for implementing a cell-based pipeline, according to some implementations.

FIG. 2 is a block diagram of a computer system 210 suitable for implementing a cell-based pipeline 101 in the pipeline server 105A. The clients 103, the language modeling server 105B, and the audio data collection platform 119 can also be implemented in the form of such computer systems 210. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media such as solid state drives (SSDs)), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or another pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computing device 210), for example via the network interface 248 or modem 247. In FIG. 2, the cell-based pipeline 101 is illustrated as residing in system memory 217. The workings of the cell-based pipeline 101 are explained in greater detail below in conjunction with FIGS. 3-6D.

The storage interface 234 is coupled to one or more hard disks 244 (and/or other standard storage media such as SSDs). The hard disk(s) 244 may be a part of computing device 210, or may be physically separate and accessed through other interface systems.

The network interface 248 and or modem 247 can be directly or indirectly communicatively coupled to a network 107 such as the internet. Such coupling can be wired or wireless.

FIG. 2 illustrate a cell-based pipeline 101 running in the system memory 217 of the pipeline server 105A. As described above, the functionalities of the cell-based pipeline 101 can reside on the language modeling server 105B, the audio data collection platform 119, a client 103, or be distributed among multiple computer systems 210, including within a cloud-based computing environment in which the functionalities of the cell-based pipeline 101 are provided as a service over the network 107.

It is to be understood that although the pipeline server 105A and the language modeling server 105B are illustrated in FIG. 1 as discrete entities, the illustrated cell-based pipeline 101 and language modeling represent collections of functionalities, which can be instantiated as a single or multiple modules or units on one or more computing devices 210 as desired.

It is to be understood that the cells 117 of the cell-based pipeline 101 can be instantiated (for example as object code or executable images) within the system memory 217 (e.g., RAM, ROM, flash memory) of any computer system 210, such that when the processor 214 of the computer system 210 processes a cell activity, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the cell-based pipeline 101 can be stored on computer-readable storage media. Any form of tangible computer readable storage medium can be used in this context, such as magnetic or optical storage media. As used herein, the term "computer-readable storage medium" does not mean an electrical signal separate from an underlying physical medium.

Figure 3:
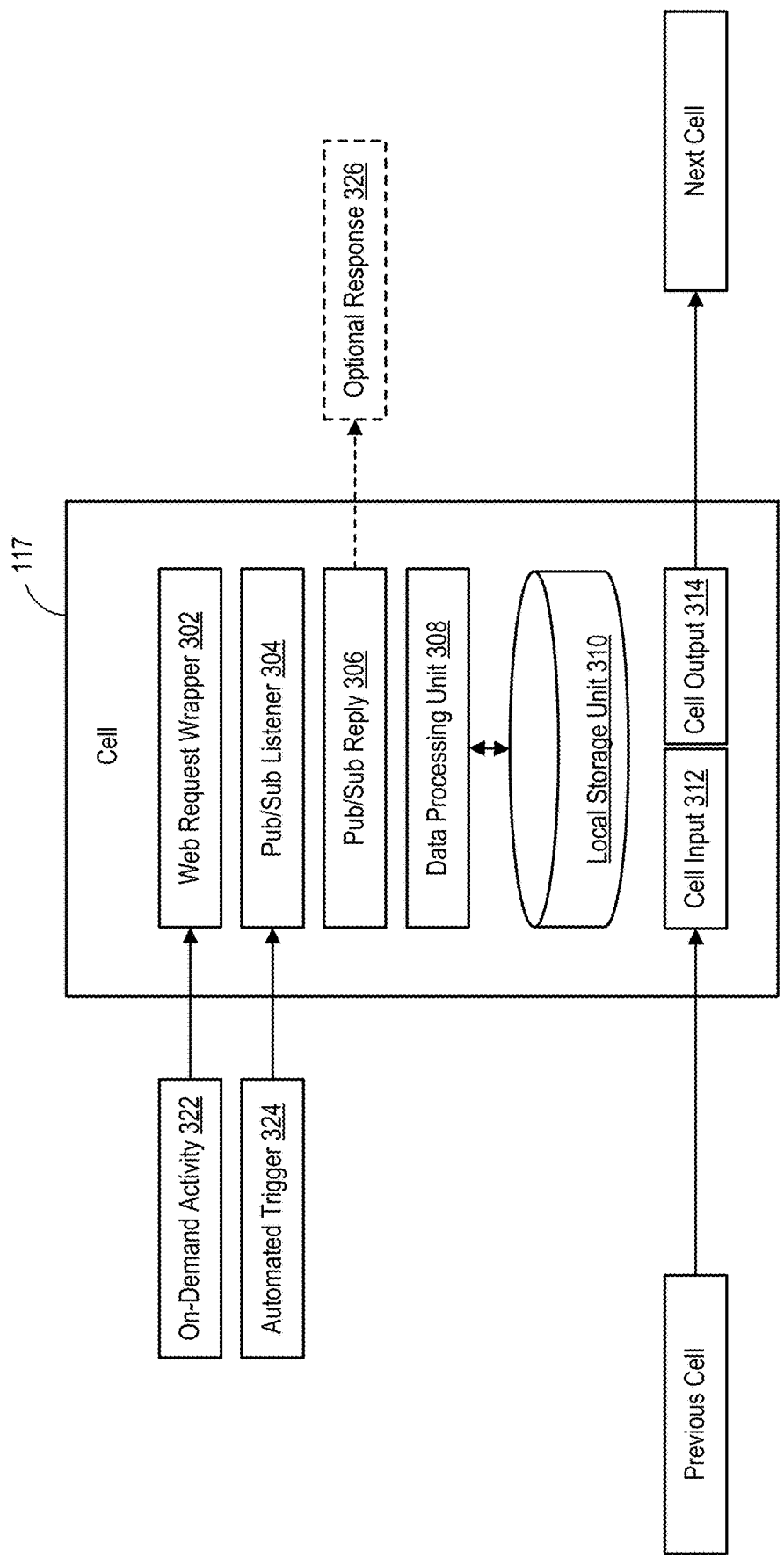
FIG. 3 is a block diagram of an exemplary cell in a cell-based pipeline, according to some implementations.

FIG. 3 depicts specific components of a generic pipeline cell 117 in the cell-based pipeline 101, according to some implementations. As shown in the figure, a generic pipeline cell 117 comprises a webrequest wrapper 302, a Pub/Sub (Publish/Subscribe) listener 304, a Pub/Sub reply 306, a data processing unit 308, a local storage unit 310, a cell input 312, and a cell output 314. It should be noted that for a specific cell, there may be more, fewer and/or different components than those of the generic cell illustrated in FIG. 3.

The webrequest wrapper 302 is a wrapper for a webrequest call in a web environment. A wrapper is a computer program whose main purpose is to call a second subroutine or a system call with little or no additional substantive computation. Accordingly, a wrapper around HttpWebRequest functions to issue a proper HTTP webrequest. This may be achieved through receiving certain on-demand activity 322 (e.g., an on-demand request) as shown in FIG. 1. In one example, a webrequest wrapper 302 is a wrapper around HttpWebRequest to issue a POST request with some payloads, e.g., a list of IDs for sample selection for training and testing datasets, as described in more detail below. Other webrequests that are used by the cell-based pipeline 101 may also be delivered to respective cells through the webrequest wrapper 302.

The Pub/Sub listener 304 listens to messages or event notifications published to cloud Pub/Sub topics. As described elsewhere herein, the cell-based pipeline 101 may be a cloud-based (e.g., Google Cloud-based) pipeline, for example, providing easier access and manipulation and for increased flexibility. Thus, a cloud Pub/Sub messaging system may be implemented in the cell-based pipeline 101. Accordingly, certain messages or event notifications listened by the Pub/Sub listener 304 in a specific cell 117 may trigger cloud functions specifically configured in that cell. For instance, an automated trigger 324 in FIG. 3 may publish a message or event notification to the cloud Pub/Sub topic, which is then listened by the Pub/Sub listener 304. If it is relevant, the message published to the topic then triggers function execution by the data processing unit 308 in the cell with message contents passed as input data for function execution.

The Pub/Sub reply 306 may include a return value of the function execution triggered by the message/event notification listened by the Pub/Sub listener 304. In some implementations, the Pub/Sub reply 306 may comprise results that are to be stored locally in the cell 117 or passed to another cell or stored in a storage. In some implementations, the Pub/Sub reply 306 may include generating an optional response 326 in response to a trigger event or message published to the cloud Pub/Sub topic.

The data processing unit 308 contains certain data processing functions configured for a specific cell. As described elsewhere herein, these data processing functions in a cell 117 may be cloud functions (e.g., Google Cloud Function (GCF)) that are triggered when an event being watched occurs. For example, cloud functions in a cell 117 may be triggered by specific conditions in the data source(s) 109 (e.g., Google Storage (buckets)).

In some implementations, to function as desired in the pipeline 101, a cell 117 may include some or all of the following features/capacities:

- Being able to use existing Google storage mechanisms (Big Query, Cloud Storage)
- Being able to import existing VoiceAI Python packages (e.g. being able to import a custom pip via GemFury or GitHub via a repository URL line in a requirements.txt)
- Being able to accept parameterization from a pipeline user Storage configuration(s): (1) private persistent storage to save settings, defaults, and self-information between activities; (2) private caching for computation; and/or (3) storage for inter-cell communication Being callable as a webservice and being able to accept scheduling In some instances, cells at the head of the pipeline respond to scheduling, but cells in other places respond to other triggers instead (e.g., where batching and queuing jobs are available)

Representing brief actions for a single cell and complexity being achieved by chaining individual cells together Being isolated in that faults in one cell do not bring down the whole pipeline Latency: once a cell has produced an output, the following cell may automatically start processing it as input, with minimal latency (either immediately or once a small batch has accumulated (minutes, generally))

Scalability: the pipeline is able to scale gracefully. For example, if machine transcripts are used for training and generate 100 times the current volume, the pipeline will scale with additional cells (except cells involving human labor)

Testable: e.g., ensuring that a cell is operating correctly by sending and retrieving canned data The local storage unit 310 stores certain information locally in a cell. For instance, a cell 107 may include a private storage that stores settings, defaults, self-information between activities, inter-cell communication, etc. In some implementations, the local storage unit 310 may include a private cache for computation performed by the data processing unit 308.

In some implementations, the local storage unit 310 may refer to any storage device accessible by a cell, or any combination thereof. For instance, the local storage unit 310 may also include the system memory 217 and/or the hard disk 244 of the pipeline server 105 accessible by a cell 117.

The cell input 312 receives data inputs and forwards input data into the data processing unit 308 for processing by a cell 117. The input data may be data output by the cell output 314 of a previous cell, or may be data acquired in other ways. For instance, larger input data may be specified via POST and an uploaded JSON (JavaScript Object Notation). An example of this is when specifying a long list of data keys, or when manually inserting data into a datastore managed by a cell 117.

The cell output 314 outputs data processed by the data processing unit 308. The output data may be in different formats (e.g., a table), and may be directly fed into the cell input 312 of a next cell as input data. In some implementations, the output data may trigger the next cell to automatically process it as input, to minimize the latency of the pipeline 101 in processing the data. In some implementations, instead of outputting the data to a next cell, the cell output 314 may write the data into a local or remote store.

While the generic structure of a single cell 117 is illustrated in FIG. 3, when chained together, these cells 117 may implement a large variety of functions with different levels of complexity. This is achieved through different functions configured for specific individual cells. Many different activities involved in training and testing dataset preparation in language modeling, including many activities that currently require human manipulation, may be implemented by providing one or more cells for such specific activities. When these cells are chained together to form a pipeline, the activities expected in training and testing dataset preparation can be easily achieved through such a cell-based pipeline 101. This provides a highly efficient process, greatly saving labor, cost and time for language modeling.

Figure 4:
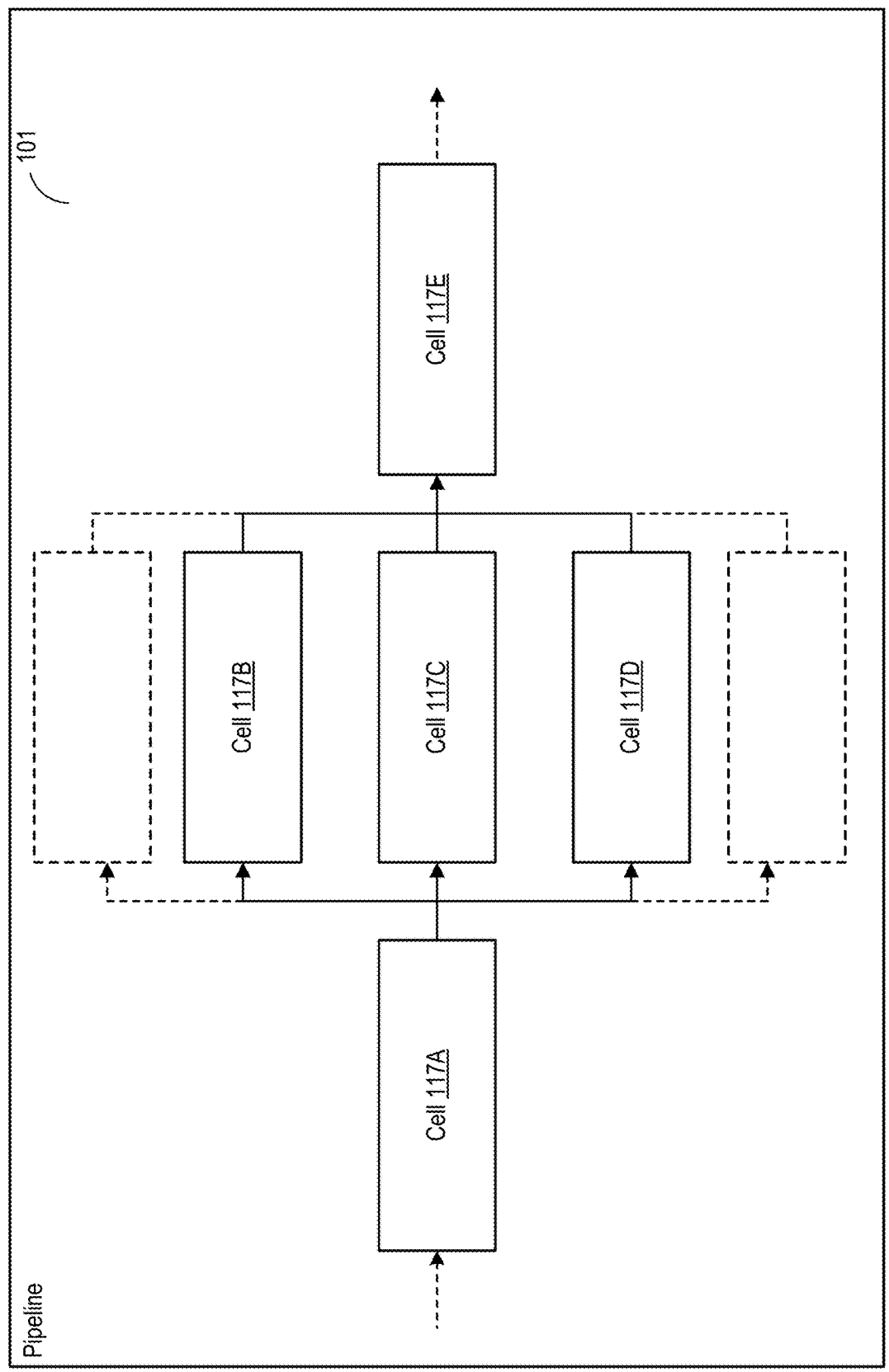
FIG. 4 is a block diagram of an exemplary generic cell-based pipeline, according to some implementations.

FIG. 4 is a block diagram illustrating a generic structure of a cell-based pipeline 101. As illustrated, a cell may be connected to one or more other cells with different purposes. The pipeline 101 may be scalable by including more cells 117 to handle an increased volume of data inputs, or by chaining additional cells together to achieve varying levels of complexity. For instance, as indicated by the dotted arrows and blocks, more cells may be added over the illustrated cell 117B, under the cell 117D, before the cell 117A, and/or after the cell 117E to increase the scale and/or complexity of the illustrated pipeline.

On the other hand, each cell 117 in FIG. 4 may be isolated so that a fault in one cell does not bring down the whole pipeline 101. Due to the unique properties of each pipeline cell, the disclosed pipeline may provide greatly improved flexibility and maintainability. Further, by utilizing specific functional cells to replace certain tasks that conventionally require human manipulation of data, the disclosed pipeline provides improved consistency, while at the same time decreasing the management overhead of a pipeline for language modeling.

It should be noted that different platforms may be used for implementing the cell-based pipeline 101. In one implementation, several Google Cloud Functions may be logically combined together to form all or part of a pipeline 101, in which each Google Cloud Function may be used to build a specific cell 117. In another implementation, a single Google App Engine Flexible (Flex) image may be used for setting up the pipeline 101. GCF may be appropriate for the simpler cells in the pipeline, while more complex cells that have a larger range of functionalities and stateful requirements may be deployed using Flex. All cells, either GCF-based or Flex-based or otherwise, may exhibit desired features/capacities described above. Scheduling in a head cell may be then handled by, for example: (1) Google Composer (Apache Airflow) and Google Pub/Sub; or (2) GCF can be triggered by specific conditions in Google Storage (buckets).

Referring back to training and testing dataset preparation by a cell-based pipeline 101, certain specific cells for audio data selection, slicing, editing, cleaning, etc., may be provided to automate the creation of the training and testing datasets for language modeling, as further described in detail below.

Figure 5:
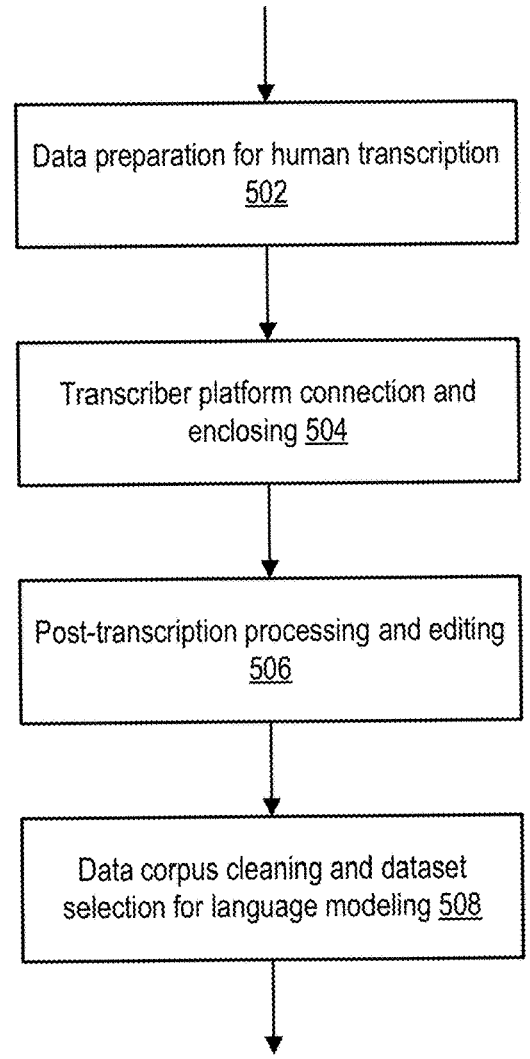
FIG. 5 is a flowchart of an exemplary method for creating sets of training and testing data for automatic speech recognition by a cell-based pipeline, according to some implementations.

FIG. 5 is a flowchart of a method for automatically creating sets of training and testing data for automatic speech recognition by the pipeline 101, according to some implementations.

At step 502, the cell-based pipeline 101 prepares audio data for human transcription. To achieve this, the cell-based pipeline 101 may first retrieve audio data from the data resources 109 by selecting a distribution of data suitable for training and testing an acoustic model. The selected audio data may be then sliced to stretches of acoustic data containing human speech between pauses during the speech. The sliced data may be companied with auto transcripts generated by VoiceAI (e.g., various existing voice-to-text tools), which are then stored in the data source(s) 109, or directly forwarded to a queue (e.g., a queue-in queue as described later in FIG. 6B) to be used as subsequent input to the respective transcriber platforms for human transcription.

At step 504, the cell-based pipeline 101 implements transcriber platform connection and enclosure. This includes enqueuing the received data slices into a queue-in queue. In some implementations, different organizations may have different transcription needs. Accordingly, different data slices and/or accompanying VoiceAI transcripts may be labeled with different tags that indicate different target transcriber platforms with different transcription capacities. Based on the tags, the data slices and the accompanying VoiceAI transcripts in the queue may be then directed to different transcriber platforms for human transcription.

At step 506, the cell-based pipeline 101 performs post-transcription processing and editing on the human transcripts upon receipt of these transcripts. The processing and editing may include error-detection of human transcripts and certain correction of identified errors. The edited transcripts may be saved (e.g., in the storage 111) as a raw corpus for further processing.

At step 508, the cell-based pipeline 101 selects specific data for corpus cleaning and storage. This may include specifying raw corpus transcript lines to select and name a selection, specifying a cleaning operation to run on a named selection, and choosing to save the lines in the versioned transcripts table and/or downloading the transcripts. The saved and downloaded transcripts may be then used for training and testing of a to-be-developed acoustic model and/or used for any other type language modeling.

In the implementations illustrated in FIG. 5, the described cell-based pipeline 101 may be in the form of a general server for creating sets of training and testing data for automatic speech recognition. However, as described further in detail in FIGS. 6A-6D, the specific functions for the pipeline may be achieved through a number of individual pipeline cells that each act independently and together cooperatively execute the above described and/or other functions.

Figure 6A:
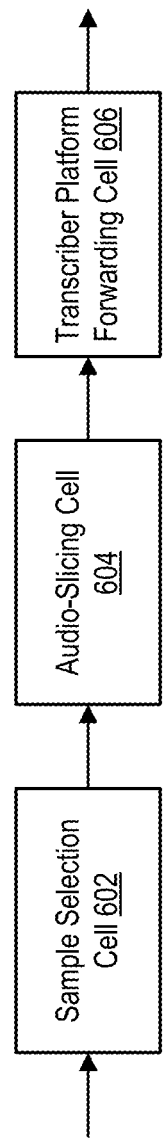
FIG. 6A is a block diagram of exemplary cells for sample selection and preparation for human transcription, according to some implementations.

FIG. 6A is a block diagram of specific pipeline cells for sample selection and preparation for human transcription, according to some implementations. To achieve the desired functions, three pipeline cells 121 are developed in the pipeline 101, which include a sample selection cell 602, an audio-slicing cell 604, and a transcriber platform forwarding cell 606, as illustrated in the figure.

The sample selection cell 602 may select certain audio data samples with accompanying VoiceAI transcripts for human transcription. This may include applying certain filtering criteria to select a distribution of data suitable for training and testing of an acoustic model. The suitable distribution of data may include audio samples with different durations and different confidence levels. For instance, the suitable distribution of data may include audio samples from 10-second snippets to 10-minute blocks, or longer. For another example, the suitable distribution of data may also include audio samples from a low confidence level (e.g., samples that are more challenging to transcribe) to a high confidence level (e.g., samples that are less challenging to transcribe). In some implementations, by selecting samples with a low confidence level for training and testing an acoustic model, the to-be-developed acoustic model may become more robust.

In some implementations, the sample selection may be based on the accompanying VoiceAI transcripts provided with these samples. For instance, a brief analysis of an accompanying VoiceAI transcript may indicate the complexity, or a confidence level, of the corresponding audio sample, which then may be relied upon for sample selection.

By applying these and/or other filtering criteria, certain numbers of audio samples may be selected to prepare for human transcription, as described further in detail below.

In some implementations, a unique sample key may be provided for a selected sample. This may allow easier tracking and retrieval of the selected audio sample and the accompanying VoiceAI transcript.

To acquire a selected audio sample, the sample selection cell 602 may use preset or default formulas (e.g., GET variable), or use a list of IDs (e.g., POST variable) to request data from a specified resource (e.g., data source(s) 109). Either way, the appropriate wrappers that interact properly with the calls make the selection of a specific sample practicable to implement by the sample selection cell 602 without requiring human manipulation.

The audio-slicing cell 604 may cut, slice, trim, or otherwise process a selected audio file into stretches of acoustic data. In general, when an input sample is a long audio file, the accuracy of speech recognition decreases. In addition, certain speech recognition tools (e.g., Google speech recognition API (application program interface)) cannot recognize long audio files with high accuracy. Accordingly, among the audio samples selected by the sample selection cell 602, certain samples may benefit from the slicing, to make the samples better suited to serve as the training or testing samples for developing an acoustic model and/or for any other type language modeling.

The audio-slicing cell 604 may slice the selected audio samples based on different criteria. For instance, the audio-slicing cell 604 may split the samples into chunks of a constant size (e.g., lengths of 2 minutes). Alternatively, the audio-slicing cell 604 may split the samples based on silence. Humans pause for a short amount of time between sentences. By implementing a silence-based slicing, the audio data can be divided into sentences, which results in sliced stretches of acoustic data that are suitable for training and testing of an acoustic model.

The transcriber platform forwarding cell 606 may forward the sliced audio segments to appropriate transcriber platforms for further processing, e.g., forwarding to a queue-in queue associated with transcriber platforms. In some implementations, the accompanying VoiceAI transcripts and/or sample keys for the selected audio samples are also forwarded together with the audio slices.

In some implementations, besides the above three pipeline cells for sample selection and preparation, the cell-based pipeline 101 may scale up to include one or more additional cells for sample selection and preparation. For instance, the cell-based pipeline 101 may include an additional transcription cell (not shown), which is configured to automatically send audio data to a third-party transcription service (e.g., Google Translate®) for an initial transcription (e.g., VoiceAI transcripts). If processed this way, the samples, including the sliced audio data and the corresponding initial transcription, may provide human transcribers with multiple starting points.

In some implementations, a shared explicit datastore may be configured for the activity of these three pipeline cells 602, 604, and 606. The shared store may hold: 1) the sample keys of the selected samples, and 2) the sliced audio (i.e., audio slices). While temporary storage (e.g., defining a table in Big Query to be the key storage while remaining audio slices in Google Storage®) may be implemented in the cell-based pipeline 101, an advantage of explicit storage is the ability to inspect and inject data into the flow without disrupting the enqueuing/dequeuing semantics, which allows the sliced audio and dataset to be inspected prior to it being sent off into the transcriber platforms. One such explicit storage may be the storage 111 or the data source(s) 109 in the system 100.

In some implementations, samples may be stored against a unique session-like ID in explicit storage. Since pipeline cell activity may be specified using webservices, the storage name may be specified as a GET variable in subsequent cells, so that it is known what sample data to retrieve, process, and forward to a succeeding cell, e.g., a cell for transcriber connection and enclosing as described below.

Figure 6B:
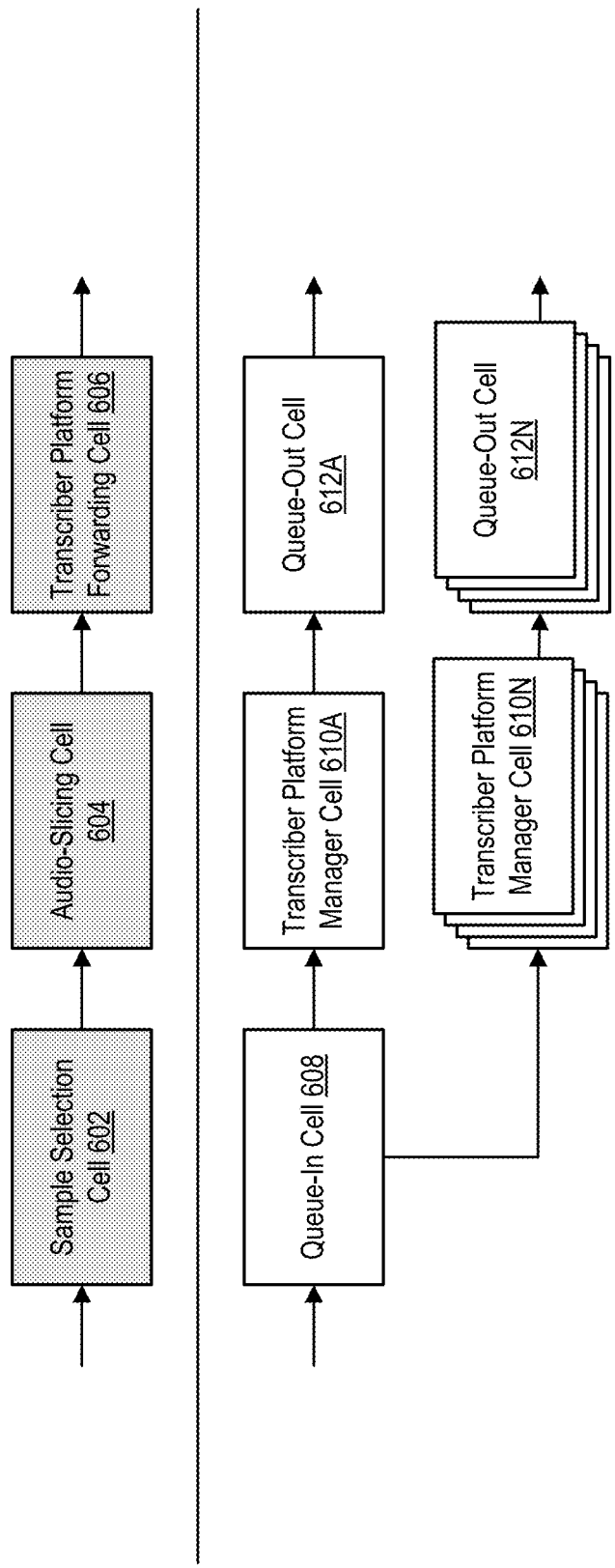
FIG. 6B is a block diagram of exemplary cells for transcriber platform connection and enclosing by a cell-based pipeline, according to some implementations.

FIG. 6B is a block diagram of specific pipeline cells for transcriber platform connection and enclosing, according to some implementations. As illustrated in the figure, a queue-in cell 608, one or more transcriber platform manager cells 610A-610N, and one or more queue-out cells 612A-612N may be further configured in the pipeline 101 to achieve the desired functions.

As discussed elsewhere herein, one advantage of the cell-based pipeline 101 is its scalability, which includes its ability to be applied to a wide range of transcriber platforms (e.g., transcriber platforms 610A-610N as shown in FIG. 6B). To achieve this scalability, in some implementations, the cell-based pipeline 101 may encapsulate the transcriber platforms 610A-610N, which then allows the pipeline 101 to be agnostic to the transcriber platforms 610A-610N. In one implementation, the cell-based pipeline 101 may treat a transcriber platform 610 as a Google App Engine Standard application, which obeys similar deployment semantics as other packages that are currently served using GitHub repositories.

While the transcriber platform encapsulation may solve the problem of the scalability, it is still not a complete automation solution, since there may still be a reason to access transcriber platform storage in certain scenarios. For instance, to dequeue untranscribed rows in order to push ahead an audio sample with a higher priority, the administration panel of a transcriber platform may be manually accessed, and a custom query may be submitted in its interactive console, all of which involves human manipulation, and thus the system is short of complete automation.

To address this issue, a queue-in cell 608 and one or more optional queue-out cells 612 along with respective transcriber platform manager cells 610 may be included in the cell-based pipeline 101. The queue-in cell 608 may include a queue-in queue that provides a list of queued-in jobs. These queued-in jobs in the queue may be set with certain metadata including: 1) target transcriber platform, and 2) priority. A queued-in queue does not need to know anything about the target transcriber platforms. The queue-in queue can be a queue from which transcription lines are drawn by the corresponding transcriber platform manager cell(s) 610.

A transcriber platform manager cell 610 may draw transcription lines from the queue-in queue 608. In some implementations, a transcriber platform manager cell 610 may only draw rows that are labelled (e.g., with a tag) for its target transcriber platform. A transcriber platform manager cell 610 may merely concern information about the interface to its target platform, without considering whether the interface is a storage interface or a Web API. In the case that the interface to a target platform is a storage interface, the transcriber platform manager cell 610 may draw transcription lines from the queue-in queue and store the drawn transcription rows for retrieval by the corresponding transcriber platform for human transcription. In the case that the interface to a target platform is a Web API, a Web API call may be initiated to deliver the drawn transcription lines to the corresponding transcriber platform for human transcription.

In some implementations, depending on the semantics of data returned from human transcription, a queue-out queue 612 may be optionally included for a specific transcriber platform. A queue-out cell 612 may include a queue-out queue that lists data to be asynchronously pulled back from storage. For instance, the queue-out cell 612 may pull the human transcripts stored by a corresponding transcriber platform.

In some implementations, the storage associated with human transcription may be configured to accommodate the following features: 1) the sampling may be configured to follow different protocols (an example is "500-words for 500-transcripts"); 2) partitions ("test", "train", "develop") to be supported by storages by this point in the pipeline may be labelled; 3) some record of what samples have already been sent for transcription may be made here—this can be achieved by inspecting the presence of transcriptions in downstream tables; and 4) a platform tag for the respective target platform may be used to label the corresponding transcripts (later on, the platform tag may accompany or be replaced by an identifier for a named DAG (Direct Acyclic Graph) workflow).

In some implementations, instead of a storage interface, the interface to a target transcriber platform may be a Web API interface. Since a Web API call is generally synchronous (e.g., Google Phone ASR), the corresponding transcriber platform manager cell 610 may play the role of a queue-out queue, and thus a corresponding queue-out cell 612 may not be included in the pipeline 101.

In some implementations, an asynchronous process may be implemented to push and pull data from a set of buckets instead of the Web API, even though there is a Web API interface for the corresponding describer platform. Regardless, after transcription through transcriber platform(s), the initial transcripts may be further processed for post-transcription labelling and corrections, as described in detail below.

Figure 6C:
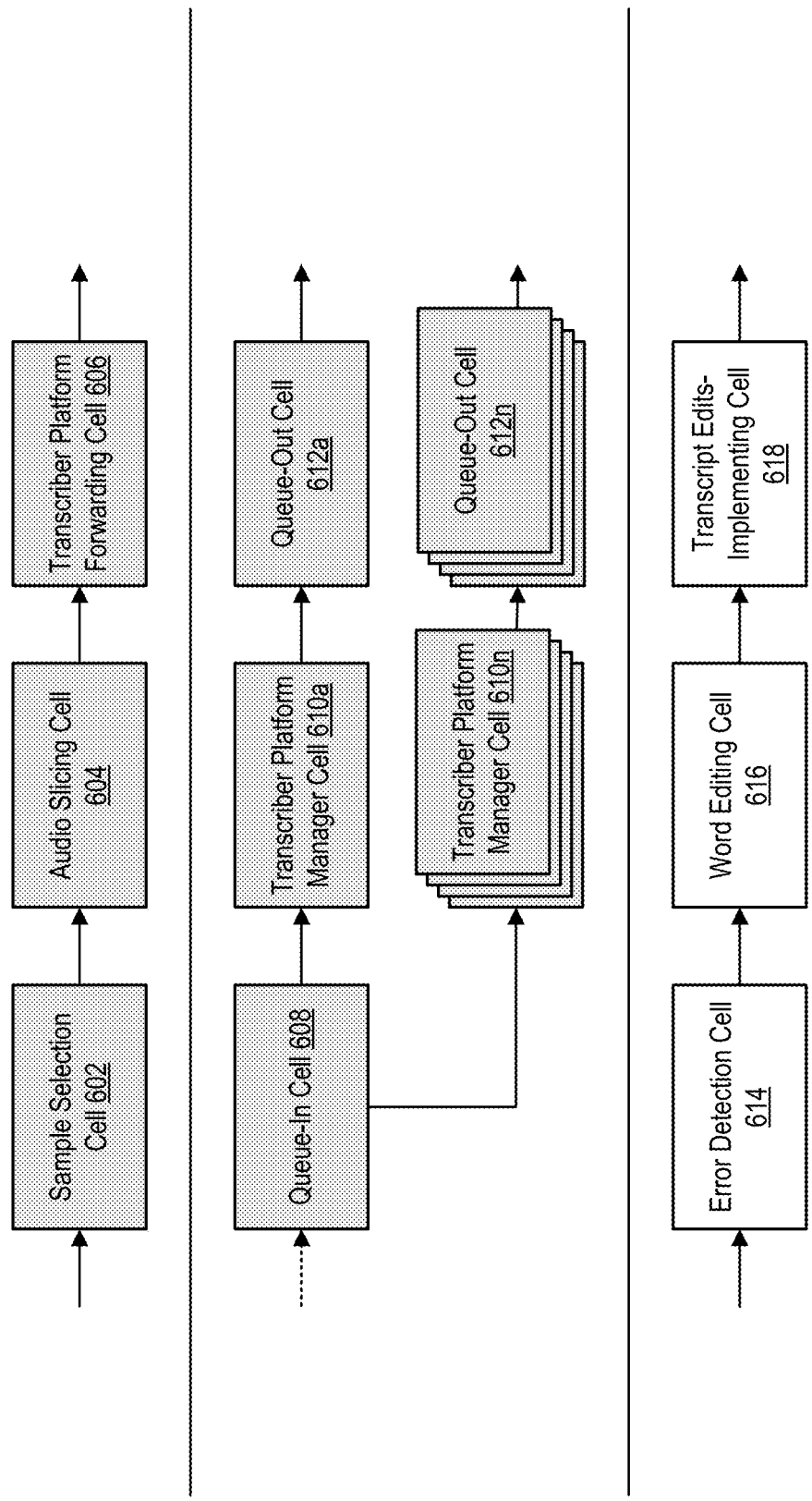
FIG. 6C is a block diagram of exemplary cells for post-transcription processing and editing by a cell-based pipeline, according to some implementations.

FIG. 6C is a block diagram of specific pipeline cells for post-transcription labelling and correction, according to some implementations. To achieve the desired functions, an error detection cell 614, a word editing cell 616, and a transcript edits-implementing cell 618 may be further configured in the pipeline, as illustrated in the figure.

The error detection cell 614 may detect errors in the initial transcripts introduced during human transcription. This error-presence detection may be fully automated, and may happen after human transcription but before corpus cleaning, as described below.

The word editing cell 616 may edit an initial transcript. This may include correcting certain errors identified by the error detection cell 614. In some implementations, a single pipeline cell may capture editing information on more than one token (or subject) for a single initial transcript. In some implementations, the edits are documented as discrete operations and retrieved as a JSON document or CSV (comma-separated values) for inspection and other purposes.

The transcript edits-implementing cell 618 may apply edits to human transcripts. As discussed above, since the edits in the pipeline 101 are documented as discrete operations, when retrieved, these edits may in the JSON or CSV format. Accordingly, to pivot the data back into the form of transcript, a "reduce" step may be implemented by the transcript edits-implementing cell 618, which traverses the recorded edits and applies them into human transcripts. After editing and/or correction, the human transcripts may be stored as a raw corpus for further processing, as described further in detail below.

Figure 6D:
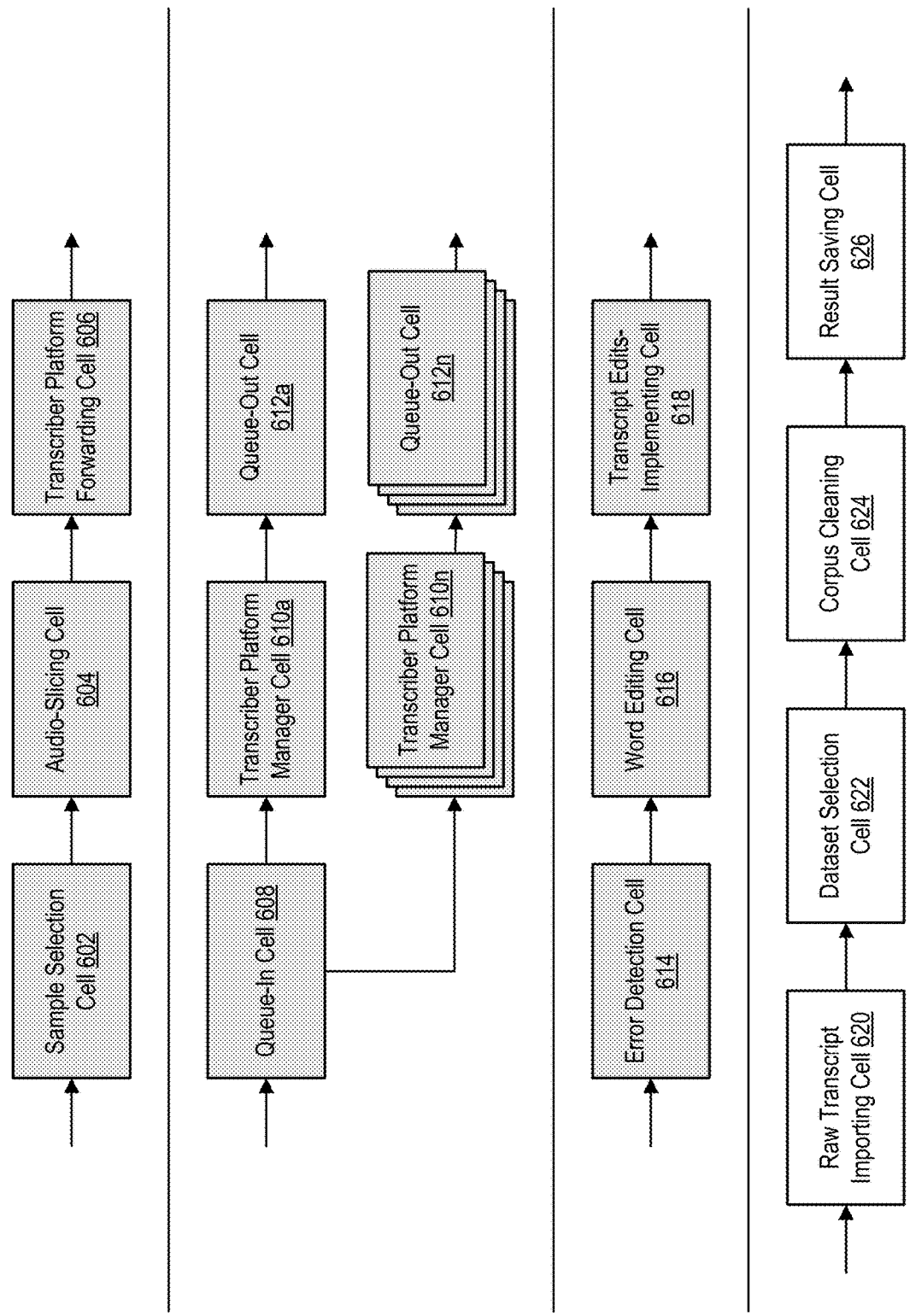
FIG. 6D is a block diagram of exemplary cells for corpus cleaning and results saving by a cell-based pipeline, according to some implementations.

FIG. 6D is a block diagram of specific pipeline cells for dataset selection, corpus cleaning, and result storage, according to some implementations. To achieve the desired functions, the pipeline 101 may further include a raw transcript importing cell 620, a dataset selection cell 622, a corpus cleaning cell 624, and a result saving cell 626, as illustrated in the figure.

The raw transcript importing cell 620 may import most recently edited raw corpus transcript lines and/or stored auto transcript lines 113 for collected audio data into a corpus table before corpus cleaning is performed.

The dataset selection cell 622 may specify the raw corpus transcript lines and/or stored auto transcript lines 113 to select, and name the selection. This may include selecting different proportions of the training and development partitions of the corpus or only lines related to a particular organization. With the selection, the same raw subsets of data may be subjected to different versions of cleaning software. This provides a huge gain in reproducibility.

The corpus cleaning cell 624 may specify a cleaning operation to run on a named selection. The corpus cleaning cell 624 may implement corpus cleaning locally on laptops or other computing devices. This may include first downloading the latest version of cleaner code, the lexicon from the repository and the raw transcript lines before corpus cleaning. The results of corpus cleaning are stored in a clean corpus table, and/or exported for download.

In some implementations, as cleaning strategies and lexicons change, the results of corpus cleaning may also change. Accordingly, different versions of the corpus may be saved in the clean corpus table, tagged with a version identifier. In some implementations, versioning information may be saved in a new table that also specifies how these particular cleaned transcript lines are created.

The result saving cell 626 may save the results of a corpus cleaning operation. To achieve this, a user may have previously instructed the pipeline to save a named selection and the cleaned transcripts using that named selection as its own version. The saved results may be then considered as the language modeling data prepared by the cell-based pipeline, which may be then used as training and testing datasets for training and testing an acoustic model.

It should be noted that, while each of the variety of cells described above has a specific position in the pipeline 101, in some implementations, some cells may be deployed without such a specific position in the pipeline 101. For instance, a cell for reporting the status of storage (size, keys present, etc.) may be placed anywhere in the pipeline 101. Another cell that can be placed anywhere in the pipeline 101 is a download cell that exports a table as a CSV for download on demand and can be used to periodically backup data off of Google Cloud while data size is still small.

It should be also noted that, while each of the variety of cells described above has specific functions in the pipeline 101, these specific functions may be not necessarily assigned to individual cells as above described. In some implementations, functions from one or more different cells may be combined, or functions in a single cell may be divided into subsets of functions instantiated across multiple cells, as long as the logic relationships among these cells remain intact. For instance, in some implementations, functions in the error detection cell 614 and the word editing cell 616 may be combined, so that a single cell is configured to replace these two cells.

By introducing the variety of pipeline cells, the disclosed pipeline provides various advantages when compared to the existing language modeling approaches. For instance, the disclosed pipeline eliminates the need for team members to remember how to perform all of the routine actions involved in sampling, sending, receiving, and cleaning data in the transcription pipeline. Instead, the team members can focus on the tasks of choosing good sampling parameters, or selecting specific data for specific use cases depending on particular data science projects (conversational moments) or customer needs (improve recognition of specific key phrases, specific Dialpad platform product, etc.). In addition, in a technical sense, the disclosed pipeline may ensure the consistency of the actions. The pipeline will operate exactly the same way using the selected default parameters each time, avoiding costly human errors leading to backtracking and repeating the data sampling process. Further, the disclosed pipeline may act as an early warning system for problems with captured data.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific implementations. However, the illustrative discussions above are not intended to be exhaustive or limited to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

What is claimed is:

1. A computer system for identifying, selecting, and generating training data for automatic speech recognition, the computer system comprising:
   a plurality of individual cell components that together forms an automatic maintainable and scalable pipeline for language modeling of audio data, the plurality of individual cell components comprising a sample selection cell, an audio slicing cell, and a transcriber platform forwarding cell, wherein:
   the sample selection cell selects a distribution of audio samples from client interaction data for human transcription to generate sets of training data for a language model, wherein the distribution of samples is selected based on a complexity of an automated voice-to-text analysis of individual audio samples;
   the audio slicing cell slices each selected sample into stretches of acoustic data containing human speech between pauses in speech; and
   the transcriber platform forwarding cell transmits the stretches of acoustic data to respective transcriber platforms for human transcription.

2. The system of claim 1, wherein the plurality of individual cell components further comprises a queue-in cell that queues a plurality of jobs, wherein each queued job has a target transcriber platform and a priority for human transcription.

3. The system of claim 2, wherein the plurality of individual cell components further comprises one or more transcriber platform manager cells that draw transcription lines for the respective transcriber platforms and deliver the drawn transcription lines to the respective transcriber platforms for human transcription.

4. The system of claim 1, wherein the plurality of individual cell components further comprises one or more queue-out cells that asynchronously pull data transcribed by the respective transcriber platforms for further processing.

5. The system of claim 4, wherein the plurality of individual cell components further comprises an error detection cell that detects errors among data transcribed by the respective transcriber platform.

6. The system of claim 5, wherein the plurality of individual cell components further comprises a word editing cell that edits errors detected by the error detection cell.

7. The system of claim 4, wherein the plurality of individual cell components further comprises a corpus cleaning cell that cleans the data transcribed by the respective transcriber platforms for language modeling.

8. The system of claim 1, wherein a cell component further comprises a data processing unit, an in-cell storage unit, a web request wrapper, and a pub/sub listener.

9. The system of claim 1, wherein the individual cell components of the plurality chain together to form the pipeline.

10. The system of claim 9, wherein a chained cell component is isolatable from one or more other cell components in the pipeline, so as to not affect the whole pipeline when the chained cell component fails or faults.

11. The system of claim 1, wherein a cell component further comprises a data input port to receive data outputted by a previous cell component.

12. The system of claim 1, wherein a cell component further comprises a data output port to output data to a next cell component.

13. The system of claim 1, wherein a cell component is callable as a webservice.

14. The system of claim 1, wherein a cell component accepts scheduling.

15. A method for preparing human transcription of voice data for language modeling, the method comprising:
selecting a distribution of samples from client interaction data for human transcription to generate sets of training data for a language model, wherein the distribution of samples is selected based on a complexity of an automated voice-to-text analysis of individual audio samples;
slicing each selected sample into stretches of acoustic data containing human speech between pauses in speech; and
transmitting the stretches of acoustic data to respective transcriber platforms for human transcription.

16. The method of claim 15, further comprising:
asynchronously pulling data transcribed by the respective transcriber platforms for further processing.

17. The method of claim 16, further comprising:
detecting errors among the data transcribed by the respective human transcriber platforms.

18. The method of claim 17, further comprising:
editing the detected errors among the data transcribed by the respective human transcriber platforms.

19. The method of claim 18, wherein the editing is in a JavaScript Object Notation (JSON) or a Comma Separated Values (CSV) format, the method further comprising:
traversing recorded edits in the JSON or CSV format and applying the recorded edits to human transcripts.

20. The method of claim 18, further comprising:
cleaning edited human transcripts transcribed by the respective human transcriber platforms for language modeling.

21. A computer system for identifying, selecting, and generating training data for automatic speech recognition, the computer system comprising:
a plurality of individual cell components that together forms an automatic maintainable and scalable pipeline for language modeling of audio data, the plurality of individual cell components comprising a sample selection cell, an audio slicing cell, and a transcriber platform forwarding cell, wherein:
the sample selection cell selects a distribution of audio samples from client interaction data for human transcription to generate sets of training data and testing data for a language model of a language modeling server, wherein the distribution of samples is selected based on a complexity of an automated voice-to-text analysis of individual audio samples;
the audio slicing cell slices each selected sample into stretches of acoustic data containing human speech between pauses in speech; and
the transcriber platform forwarding cell transmits the stretches of acoustic data to respective transcriber platforms for human transcription.

22. A method for preparing human transcription of voice data for language modeling, the method comprising:
selecting a distribution of samples from client interaction data for human transcription to generate sets of training data and testing data for a language model, wherein the distribution of samples is selected based on a complexity of an automated voice-to-text analysis of individual audio samples;
slicing each selected sample into stretches of acoustic data containing human speech between pauses in speech; and
transmitting the stretches of acoustic data to respective transcriber platforms for human transcription.

* * * * *